US009909942B2

(12) United States Patent
LaBelle et al.

(10) Patent No.: US 9,909,942 B2
(45) Date of Patent: Mar. 6, 2018

(54) ACCELERATION-SENSING ELECTROCHEMICAL PRESSURE SENSOR COMPOSITIONS

(71) Applicants: Arizona Board of Regents on behalf of Arizona State University, Scottsdale, AZ (US); Presidium USA Inc., New York, NY (US)

(72) Inventors: Jeffrey LaBelle, Tempe, AZ (US); Jim Blumsom, London (CA); Peter Lazaravich, Chandler, AZ (US)

(73) Assignees: Arizona Board of Regents on Behalf of Arizona State University, Scottsdale, AZ (US); Presidium USA Inc., New York, NY (US)

( * ) Notice: Subject to any disclaimer, the term of this patent is extended or adjusted under 35 U.S.C. 154(b) by 0 days.

(21) Appl. No.: 15/414,238

(22) Filed: Jan. 24, 2017

(65) Prior Publication Data
US 2017/0131163 A1 May 11, 2017

Related U.S. Application Data (63) Continuation of application No. PCT/US2015/041386, filed on Jul. 21, 2015.
(Continued)

(51) Int. Cl.
*G01M 7/00* (2006.01)
*G01L 5/00* (2006.01)
(Continued)

(52) U.S. Cl.
CPC .......... *G01L 5/0052* (2013.01); *A41D 1/002* (2013.01); *A41D 20/00* (2013.01); *A42B 3/046* (2013.01); *A63B 71/10* (2013.01); *G01P 15/12* (2013.01)

(58) Field of Classification Search
CPC ....... G01L 5/0052; A41D 1/002; A41D 20/00; G01P 15/12; A42B 3/046; A63B 71/10
(Continued)

(56) References Cited

U.S. PATENT DOCUMENTS 3,996,922 A * 12/1976 Basham ............... A61B 5/6892
307/400
4,844,374 A * 7/1989 Mori ........................ B60R 22/40
242/384.4
(Continued)

FOREIGN PATENT DOCUMENTS

CA 2706959 A1 6/2009
WO 2014/100045 A1 6/2014

OTHER PUBLICATIONS

Patent Cooperation Treaty, International Searching Authority, International Search Report and Written Opinion for PCT/US15/41386, 8 pages. (Oct. 23, 2015).
(Continued)

*Primary Examiner* — Max Noori
(74) *Attorney, Agent, or Firm* — Gavin J. Milczarek-Desai; Quarles & Brady LLP (57) ABSTRACT

An accelerometer 100 which includes a bracket 110, a pair of electrodes 210/220/230/240/250, a first electrically conductive foam 120, a second electrically conductive foam 130, wherein the first electrically conductive foam and the second electrically conductive foam are inserted between the pair of electrodes and the bracket.

8 Claims, 10 Drawing Sheets

Related U.S. Application Data (60) Provisional application No. 62/029,176, filed on Jul. 25, 2014.

(51) Int. Cl.
*G01P 15/12* (2006.01)
*A41D 1/00* (2018.01)
*A41D 20/00* (2006.01)
*A42B 3/04* (2006.01)
*A63B 71/10* (2006.01)

(58) Field of Classification Search
USPC ........................................ 73/12.04, 760, 780
See application file for complete search history.

(56) References Cited

U.S. PATENT DOCUMENTS

| | | | | |
|---|---|---|---|---|
| 6,529,122 | B1* | 3/2003 | Magnussen | G01L 1/205 200/511 |
| 7,210,351 | B2* | 5/2007 | Lo | G01P 15/125 73/510 |
| 2006/0283246 | A1* | 12/2006 | Weinberg | G01P 15/125 73/504.16 |
| 2007/0034007 | A1* | 2/2007 | Acar | G01P 15/0888 73/514.01 |
| 2010/0152619 | A1* | 6/2010 | Kalpaxis | A61B 5/0002 600/592 |
| 2010/0181871 | A1 | 7/2010 | Daniel et al. | |
| 2010/0277328 | A1* | 11/2010 | Mullan | G08B 29/185 340/665 |
| 2011/0117810 | A1* | 5/2011 | Morley | A63H 3/02 446/369 |
| 2011/0319787 | A1 | 12/2011 | Lamoise et al. | |

OTHER PUBLICATIONS

Mannsfeld, S. et al. "Highly sensitive flexible pressure sensors with microstructured rubber dielectric layers." Nature Materials. vol. 9. Issue 9, pp. 859-864 (Sep. 12, 2010).

Tuck, K. "Frequency Analysis in the Industrial Market Using Accelerometer Sensors." Freescale Semiconductor, Application Note, pp. 1-13 (Jul. 2008).

Payne, R. S., et al. "Surface Micromachining: From Vision to Reality to Vision [Accelerometer]." IEEE International Solid-State Circuits Conf. Digest of Technical Papers. 41st ISSCC, pp. 164-165, 358 (Aug. 15, 1995).

Deng T., et al. "A MEMS Based Electrochemical Seismic Sensor". IEEE Conference Publications, The 17th International Conference on Solid-State Sensor, Actuators and Microsystems, pp. 920-923 (2013).

Phan D. H., et al. "Estimation of Respiratory Waveform and Heart Rate using an Accelerometer". IEEE Conference Publications, The 30th Annual International Conference of the IEEE Engineering in Medicine and Biology Society, pp. 1916-4919 (2008).

Hoff L., et al. Measurements of Heart Motion using Accelerometers. IEEE Conference Publications, The 26th Annual International Conference of the IEEE Engineering in Medicine and Biology Society, vol. 1. pp. 2049-2051 (2004).

Kwon, S., et al. "Validation of Heart Rate Extraction through an iPhone Accelerometer". IEEE Conference Publications, The 2011 Annual International Conference of the IEEE Engineering in Medicine and Biology Society, pp. 5260-5263 (2011).

Theodor, M., et al. "Implantable Accelerometer for Determination of Blood Pressure". IEEE Conference Publications, The 17th International Conference on Solid-State Sensors, Actuators and Microsystems, pp. 1659-1662 (2013).

Culhane, K. M., et al. "Accelerometers in Rehabilitation Medicine for Older Adults." Age and Ageing, vol. 34, Issue 6, pp. 556-560 (Nov. 1, 2005).

Smith, J., et al. "The Potentiostat: Electrochemistry's Utility Player." Analytical chemistry vol. 74, Issue 19, pp. 539A-541A (2002).

Rowe, A., et al. "CheapStat: An Open-Source, "do-it-Yourself" Potentiostat for Analytical and Educational Applications." PloS One, vol. 6, Issue 9, e23783, 7 pages (Sep. 13, 2011).

Dunne, L., et al. "Initial Development and Testing of a Novel Foam-Based Pressure Sensor for Wearable Sensing." Journal of NeuroEngineering and Rehabilitation, vol. 2, Issue 1, 7 pages (Mar. 1, 2005).

Coyle, S., et al. "Textile-Based Wearable Sensors for Assisting Sports Performance," IEEE Conference Publications, The 6th International Workshop on Wearable and Implantable Body Sensor Networks, Wearable and Implantable Body Sensor Networks, pp. 307-311 (2009).

Bazaka, K., et al. "Implantable Devices: Issues and Challenges," Electronics, 53 pages (Dec. 2012).

Author Unknown. "Wearable Medical Devices Market—Global Industry Analysis, Size, Share, Growth, Trends and Forecast, 2013-2019." PR Newswire, 3 pages (Feb. 2014).

Author Unknown. "The Advent of Accelerometers in Home Medical Devices," VDCResearch, 3 pages (Sep. 30, 2011).

Levy M., et al. "Birth and Evolution of the Football Helmet." Neurosurgery, vol. 55, No. 3, pp. 656-662 (Sep. 2004).

Powell J. W., et al. "Traumatic Brain Injury in High School Athletes." JAMA: The Journal of the American Medical Association, vol. 282, No. 10, pp. 958-963 (Sep. 8, 1999).

Greenwald, B., et al. "Mild Brain Injury." Rehabilitation Research and Practice, vol. 2012, Article ID 469475, 3 pages (2012).

Thurman D. J., et al. "The Epidemiology of Sports-Related Traumatic Brain Injuries in the United States: Recent Developments." The Journal of Head Trauma Rehabilitation, vol. 13, No. 2, pp. 1-8 (1998).

Taylor, C., et al. "Traumatic Brain Injury in the United States: Fact Sheet." Centers for Disease Control and Prevention. Centers for Disease Control and Prevention, vol. 66, No. 9, 17 pages, (Mar. 21, 2014).

Thompson, M., et al. "TBIs MIA: An Estimated 30,000 Undocumented Bruised Brains." Time Magazine, 4 pages (Apr. 30, 2014).

Higgins, M., et al. "Measurement of Impact Acceleration: Mouthpiece Accelerometer Versus Helmet Accelerometer." Journal of athletic training, vol. 42, No. pp. 5-10 (2007).

Healy, J., et al. "Wearable wellness monitoring using ECG and accelerometer data," Wearable Computers, 2005. Proceedings. Ninth IEEE International Symposium on Wearable Computers, 2 pages (Oct. 18-21, 2005).

Burchfield, T. R., et al. "Accelerometer-based human abnormal movement detection in wireless sensor networks," in R. Kravets & C. Petrioli (eds.), 2007, HealthNet, pp. 67-69 (Jun. 11, 2007).

Van Wieringen, M., et al. "Real-time signal processing of accelerometer data for wearable medical patient monitoring devices," Engineering in Medicine and Biology Society, 2008. EMBS 2008. 30th Annual International conference of the IEEE, pp. 2397,2400, (Aug. 20-25, 2008).

* cited by examiner

ACCELERATION-SENSING ELECTROCHEMICAL PRESSURE SENSOR COMPOSITIONS

CROSS-REFERENCE TO RELATED APPLICATIONS

This application is a continuation of PCT/US2015/041386 filed Jul. 21, 2015, which claims priority to U.S. Provisional Patent Application No. 62/029,176 filed on Jul. 25, 2014, which are incorporated by reference herein in their entirety for all purposes.

FIELD OF THE INVENTION

A polyurethane foam-based accelerometer is disclosed.

BACKGROUND OF THE INVENTION

Every day, accelerometers play an important role in improving the function and usability of common electronics, transportation, and even medical devices. From detecting motion in cellular phones, deployment of airbags during an automotive accident, premature failure detection of household appliances, and even detection of seismic events, accelerometers make it all possible. With the rise of both wearable and implantable medical devices, accelerometers are regularly being used as an aid in diagnosis of patients.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In certain embodiments, Applicants' apparatus can be used as a one-time "telltale" accelerometer. In other embodiments, Applicants' apparatus can be used over and over with real-time response. Applications could be internal or external accelerometers for sports helmets, i.e. a good use of a telltale with a specific threshold. Other implementations include airloads, structural loads, as a measure of proper preload (telltale), impact and ballistics testing (including body armor and perhaps even applied to tanks and other vehicles), acoustic loads (otherwise hard to measure), ground loads, and the like.

Applicants' polyurethane foam-based accelerometer provides a scalable, low cost, and robust sensor. The Applicants' accelerometer differs from conventional accelerometers in size, method of detection, sensitivity range, and ability to be designed into an application typically unfit for commercial accelerometers.

In certain embodiments, Applicants' apparatus comprises three main components: a PCB sensor, a weighted mass, and two pieces of electrically conductive polyurethane foam which encompass the weight.

The PCB based copper and gold plated sensor can be applied to various applications by adjusting either the weight or the type of foam. Foams can vary in thickness, density, and composition, each allowing for a specific dynamic range and response to be achieved.

Applicants' accelerometer was tested at three frequencies, 6.281 Hz, 8.353 Hz, and 11.000 Hz using five different sensor designs. Treatment of the conductive polyurethane foam was also tested to determine how the sensor will behave over time and under varying conditions. The flexible nature of the foam sensor allows for application along curved surfaces, including the inside of a helmet, around a limb, or inside the sole of a shoe. Signal detection is accomplished through the use of amperometric-it and cyclic voltammetry, an approach that is unique as compared to conventional accelerometers currently on the market. The overall size, range, and scalability of Applicants' accelerometer lends itself well to many applications within the medical and sports fields.

A potential application of Applicants' accelerometer includes monitoring impact forces, and resulting head injuries, sustained by persons wearing helmets on the job site, for recreational purposes, or in an athletic endeavor. The foam construction of the accelerometer lends itself well to integration inside of a padded helmet for easy monitoring. Detection of the intensity, duration, and localized region of impact to a person would be a valuable piece of information for treatment and reduction of traumatic brain injuries. Traumatic brain injury results from a sudden acceleration, deceleration, or impact force to the head. While typically thought of as a sports related injury, traumatic brain injury is the result of many different mechanisms, and accounts for 138 deaths in the United States daily.

Traumatic brain injuries are not unique to any age range, as they are a growing problem in high school athletes and soldiers in the military. It is believed that number of reported traumatic brain injuries cases is much lower than actuality as there exists levels of severity many of which are undetected or not severe enough to warrant treatment or reporting. Furthermore, helmets that are performing correctly will have a finite lifetime and will need to be replaced before injury comes to the user, another instance where accumulated impact data will be critical not only from a safety aspect but cost as well.

Accelerometer data is being utilized in the design of medical devices, both wearable and implantable, for the purpose of monitoring patient well-being. These devices are often combined with other sensors for the purpose of gathering multiple data points about a user.

Applicants' have discovered that high-density polyurethane electrostatic discharge (ESD) foam comprises desirable traits for a sensor design. ESD foam comes in several varieties including high and low density, assorted thicknesses, and varying foam chemical composition. ESD foam is typically used to protect electronics from static electricity during storage and transportation, however its conductive properties allow it to act as a variable resistor when varying forces are applied to it. Compressing, bending, or stretching the foam changes its resistance allowing it to be used as a sensor for this particular application.

Existing designs, including the Applicants' accelerometer, are based on a resistance change that occurs when a conductive foam undergoes a deformation of its natural shape. One research team utilized foam-based sensors embedded inside a wearable vest for the purpose of measuring breathing patterns, resulting in sinusoidal curves. Similarly, another team created a conductive foam by applying a layer of the conductive polymer polypyrrole (PPy) for the purpose of measuring the breathing of athletes during physical exertion.

A potentiostat was used for its ability to detect small changes in current over a very large dynamic range accurately. Potentiostats are used for studying electrochemical reactions across many areas including environmental, industrial, drug, and the food industry. While many commercially available units are cost prohibitive, there has been effort to create low cost open source models for use in developing areas. At its simplest, a potentiostat works by measuring the amount of current flowing between two electrodes, the working and counter, the result of which is output with respect to the elapsed time.

The three electrode setup of a potentiostat allows for changes in current to be measured at a single electrode, the working, without receiving interference from the counter or reference. When the foam is deformed in some way, either bent, compressed, or stretched, there is a change in the current being output by the system. In this way forces can be measured due to the change in resistance of the foam. By adding a calibrated mass to the system, acceleration due to gravity can then be determined.

In certain embodiments, Applicants' accelerometer places the foam and calibrated mass under compression against the electrode surface, eliminating the need for any type of adhesives. The sensor is also scalable for many different applications and dynamic ranges.

Testing of the sensor was achieved using a variable speed, reciprocating saw which provided a sinusoidal movement across a range of frequencies. Testing against a commercially available accelerometer allowed for analysis of signal amplitude and harmonics, while being able to verify the reliability of the sensor itself.

Materials and Methods

Figure 1A:
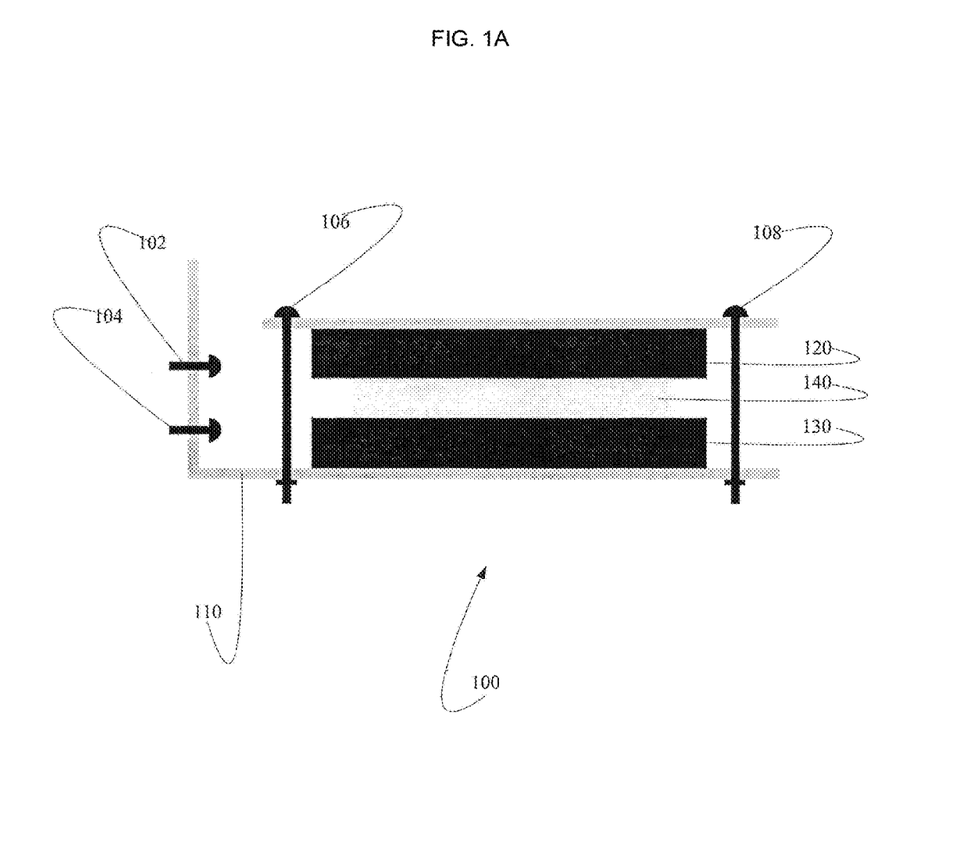
FIG. 1A is a side view of Applicants' assembly 100.
Figure 1B:
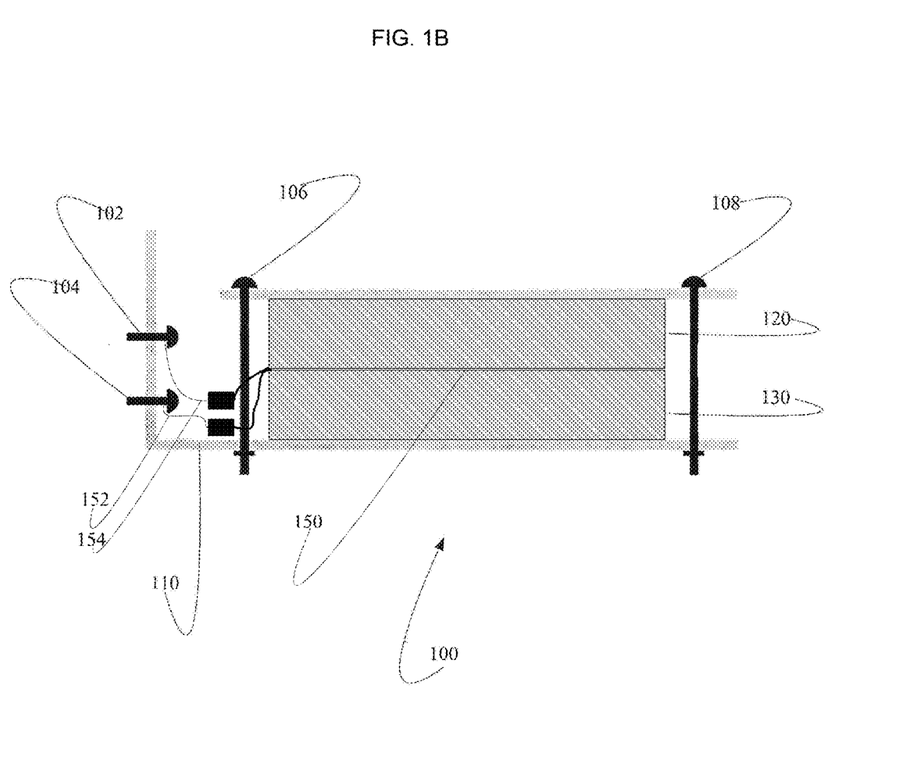
FIG. 1B is a side view of Applicants' assembly 102.

Referring now to FIGS. 1A and 1B, a sheet of 1.588 mm thick stainless steel (Industrial Metal Supply Co, Phoenix, Ariz., USA) was used for the body of the accelerometer 100. Conductive high-density polyurethane foam sheets 6.35 mm in thickness were used for the internals of the sensor (ESDProduct, Torrance, Calif., USA). A 6.35 mm piece of stainless bar stock was used as the mass for the accelerometer (Industrial Metal Supply Co, Phoenix, Ariz., USA).

Sensor design was accomplished using PADS PCB Design Software (Mentor Graphics Corporation, Wilsonville, Oreg., USA). Custom designed copper PCB electrodes were printed (Advanced Circuits—Tempe Division, Tempe, Ariz., USA) and used as the sensing portion of the accelerometer. Equipment used in the testing of the sensors included the CH instruments Electrochemical Analyzer CHI1230A (CH Instruments, Inc., Austin, Tex., USA), and the CSI3003X5 DC regulated power supply (Circuit Specialists, Mesa, Ariz., USA). Testing was performed on a variable speed reciprocating saw (Harbor Freight Tools, Tempe, Ariz., USA). Other measuring equipment included an APX-60 digital scale (Denver Instrument, Bohemia, N.Y., USA), MMA7361 Freescale Semiconductor three axis accelerometer (Virtuabotix LLC, Colorado Springs, Colo., USA), and an Arduino Uno Rev 3 (GarageLab, Doral, Fla., USA). Other minor equipment utilized included an EC1002 soldering iron (Apex Tool Group, Sparks, Md., USA) with light duty rosin core solder (Radio Shack, Fort Worth, Tex., USA), assorted lengths of wire (General Electric, Schenectady, N.Y., USA), and M3 screws, bolts, and star washers, USB cable, and the open source Arduino IDE software (Arduino 1.0.5). Analysis of the raw data was done using Microsoft Excel (Microsoft Corporation, Redmond, Wash., USA).

Figure 2:
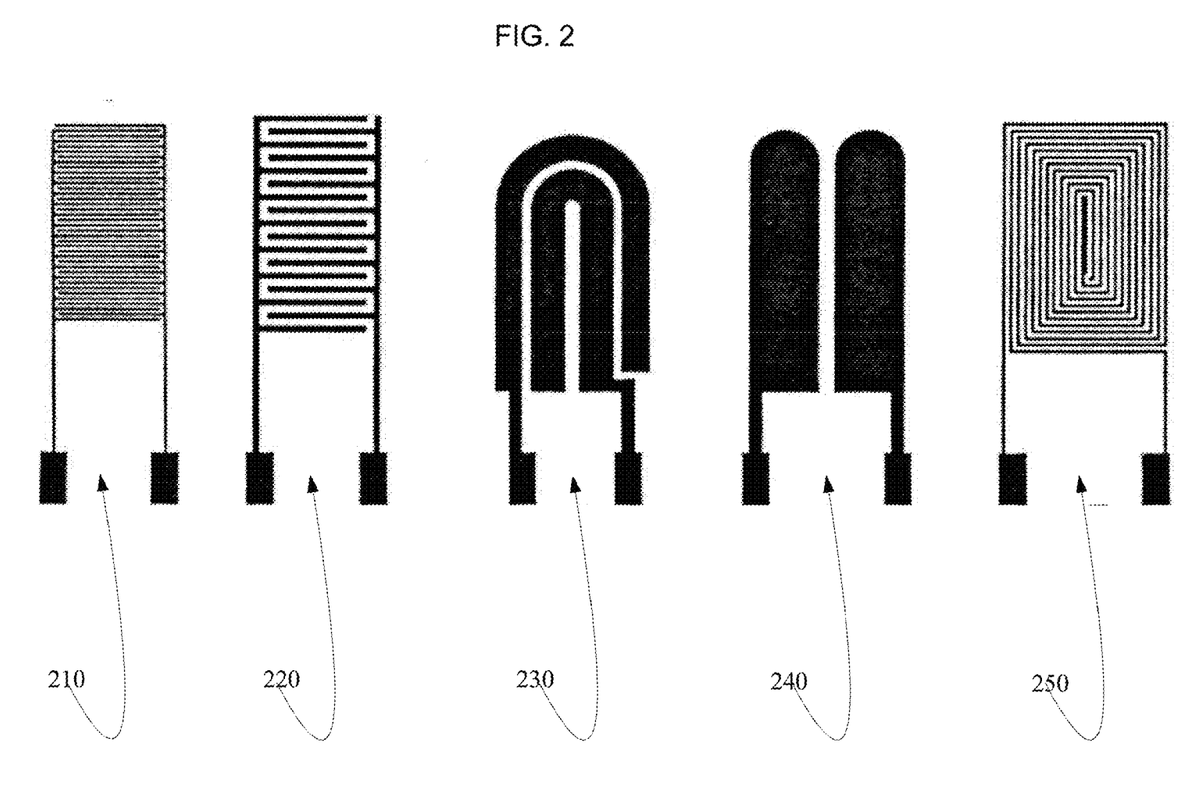
FIG. 2 shows the design of sensors 210, 220, 230, 240, and 250.

Construction of the Applicants' accelerometer began with the design of five sensors shown in FIG. 2. The various sensors printed circuit board electrode pairs shown in FIG. 2 were individually used as sensor 150 shown in FIG. 1B.

The designs were digitized and printed onto PCBs measuring 44.45 mm in length by 17.78 mm in width by 1.5 mm in thickness.

Two wires 152 and 154 were soldered onto each of the five sensor boards. Referring now to FIG. 1B, two 3 mm holes were drilled on either side of the sensing surface for attachment to a bracket through the use of screws 102 and 104.

A 1.588 mm piece of stainless steel was cut into a rectangle with measurements of 73 mm by 18.5 mm, and bent at a 90° angle 16 mm from the end such that it formed a bracket 110. A total of four, 3 mm holes were drilled into this metal bracket, two for mounting the bracket to the testing mechanism, and two for attaching the sensor to the bracket. The bracket was mounted to a reciprocating saw, which was mounted vertically such that the sensor was perpendicular to the ground.

Referring now to FIG. 1B, rectangular members 120 and 130, having in certain embodiments dimensions of 18 mm by 29 mm, were cut from the high density conductive foam sheets and inserted between the sensor 150 and the bracket 110. Referring to FIG. 1A, in certain embodiments a portion 140 of 6.35 mm stainless bar stock was cut into a square mass with weight of 23 gm. This weight 140 was inserted into the middle of the two aforementioned foam pieces.

Two screws 106 and 108 holding the sensor board to the bracket were then tightened such that the whole assembly 100 had an overall thickness of 20.2 mm. This process was repeated across each of the five designs during testing. During construction of each sensor, the metal bracket, mass, and sensor PCBs were cleaned thoroughly with Isopropanol alcohol to relieve the surfaces of contaminating oils and dirt that could negatively affect measurements.

Testing Procedures

The reciprocating saw was first clamped to a lab bench such that both accelerometers could be mounted perpendicular to the ground. The battery from the saw was not used during testing, rather the saw was connected to a DC power supply such that repeatable and variable speeds could be achieved.

Applicants' accelerometer was mounted on one side of the saw blade while the commercial MMA7361 accelerometer was mounted on the other side, keeping the system balanced during all tests. The MMA7361 was wired to the Arduino Uno Rev 3 which was in turn connected via USB to a computer for data logging. The Applicants' accelerometer was connected to the CHI1230A with the counter and reference electrodes attached to one lead of the sensor board, and the working electrode to the other. The same CHI machine, foam rectangles, calibrated mass, and frequency ranges were used to test all five of the sensor board designs and MMA7361 accelerometer.

The reciprocating saw was sequentially set to 3V, 4V, and 5V, which corresponded to 6.281 Hz, 8.353 Hz, and 11.000 Hz respectively, as verified by the MMA7361. These voltages and frequencies were chosen because they represented a range where the testing mechanism was reliable and where the sensors could reproducibly produce a signal for future data analysis and subsequent selection of the best operating design.

Data Analysis Techniques

Each of the five sensor designs, i.e. sensors 210, 220, 230, 240 and 250, were tested across the three frequencies. Resulting data from the Applicants' accelerometer and the MMA7361 was in the time domain, with the x-axis of a graph representing recorded time, and the y-axis as the magnitude of the output signal. The raw data from both accelerometers was analyzed in the frequency domain using a Fast Fourier Transform that showed the frequencies of the sensor versus the amplitude of the signal. This analysis allowed for the frequencies and magnitudes to compare to one another.

Results and Discussion

Figure 3A:
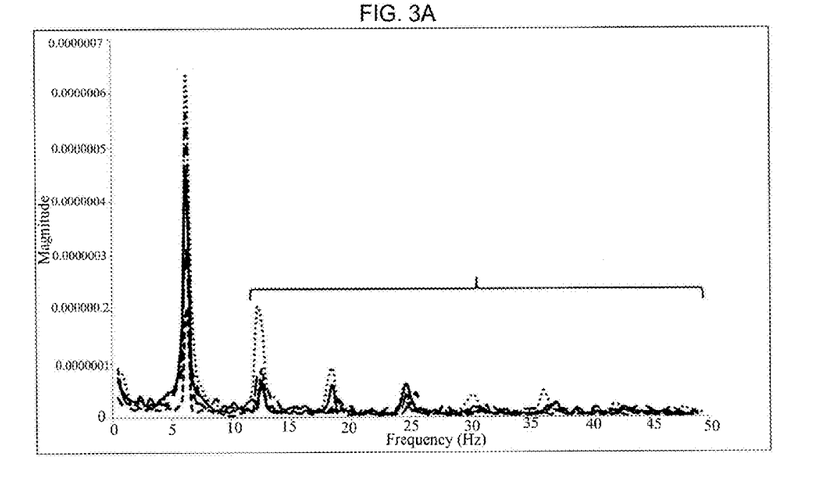
FIG. 3A shows a Fast Fourier Transform of all five Applicants' accelerometer electrodes boards at: 6.28 Hz.
Figure 3B:
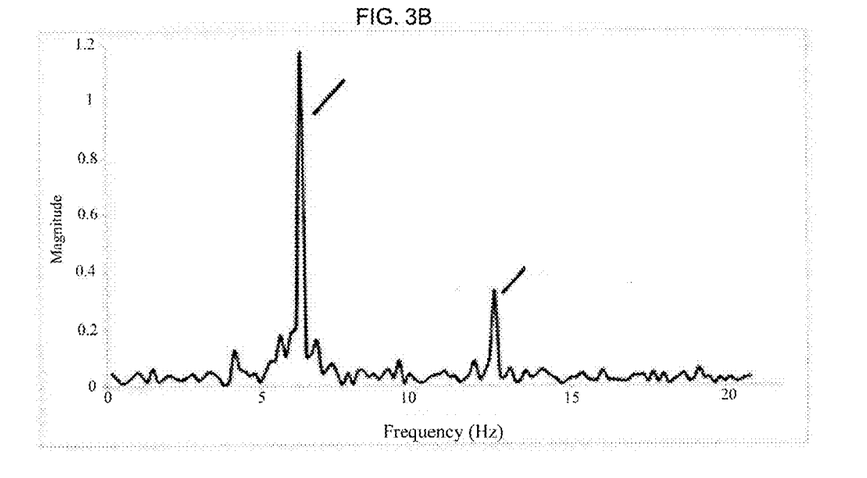
FIG. 3B shows a Fast Fourier Transform of data generated by the MMA7361 accelerometer at 6.28 Hz.

Applicants' accelerometer was evaluated at three frequencies in order to collect data about its response to the sinusoidal pattern of the reciprocating testing apparatus. FIGS. 3A and 3B graphically display the collected data after transformation into the frequency domain using a FFT.

The frequency domain graphs show the range of frequencies being detected by the two accelerometers and their relative magnitude. Comparing FIG. 3A, showing results of Applicants' accelerometer, to FIG. 3B, showing the results of the MMA7361, it can be seen that the Applicants' accelerometer is accurately detecting and representing the desired frequency (the fundamental frequency) peak well. The data in FIG. 3A has been scaled in the frequency scale such that all the sensors overlap and are aligned with the known frequency of 6.28 Hz.

FIG. 3A recites data for each of the five (5) different PCB tracings. The number of frequency harmonics detected clearly differs for the five different sensors designs 210, 220, 230, 240, and 250.

FIG. 3A shows the existence of harmonics which are a result of the rotational nature of the reciprocating saw testing apparatus. These harmonics could potentially be an important measurement for some applications. Applicants' accelerometer differs from the commercial MMA7361 accelerometer in that it has much higher peaks for the detected harmonics. This increased sensitivity of the Applicants' accelerometer is due to the high sensitivity of the conductive foam creating very small and detectable changes within the system, a feature which could be desirable for many applications, especially within the medical applications field.

Figure 4A:
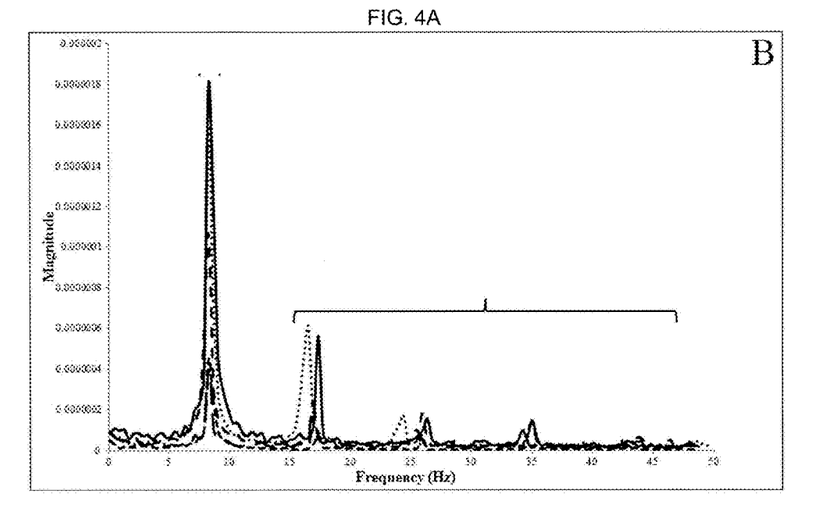
FIG. 4A shows a Fast Fourier Transform of all five Applicants' accelerometer electrodes boards at 8.3528 Hz.
Figure 4B:
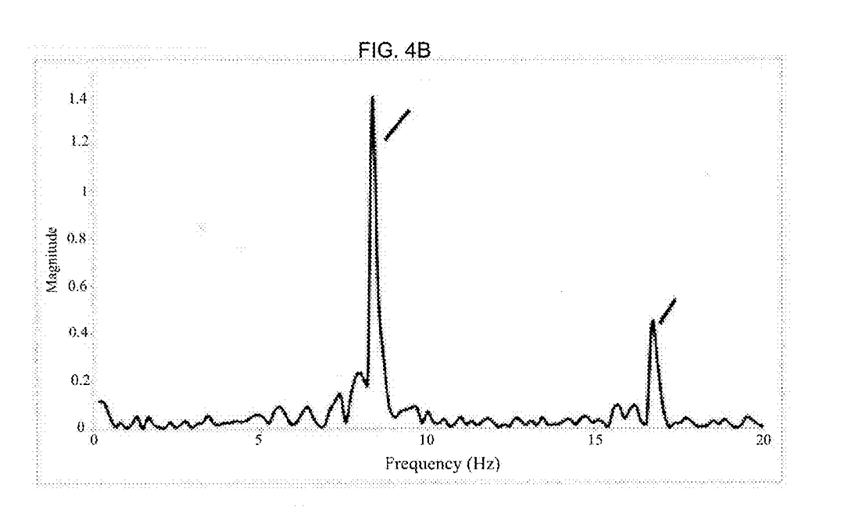
FIG. 4B shows a Fast Fourier Transform of data generated by the MMA7361 accelerometer at 8.35 Hz.

FIGS. 4A and 4B depict data for the 8.35 Hz testings. FIG. 4A recites data for each of the five (5) different PCB tracings. The number of frequency harmonics detected clearly differs for the five different sensors designs 210, 220, 230, 240, and 250.

FIG. 4A shows the existence of harmonics which are a result of the rotational nature of the reciprocating saw testing apparatus. These harmonics could potentially be an important measurement for some applications. Applicants' accelerometer differs from the commercial MMA7361 accelerometer in that it has much higher peaks for the detected harmonics. This increased sensitivity of the Applicants' accelerometer is due to the high sensitivity of the conductive foam creating very small and detectable changes within the system, a feature which could be desirable for many applications, especially within the medical applications field.

Figure 5A:
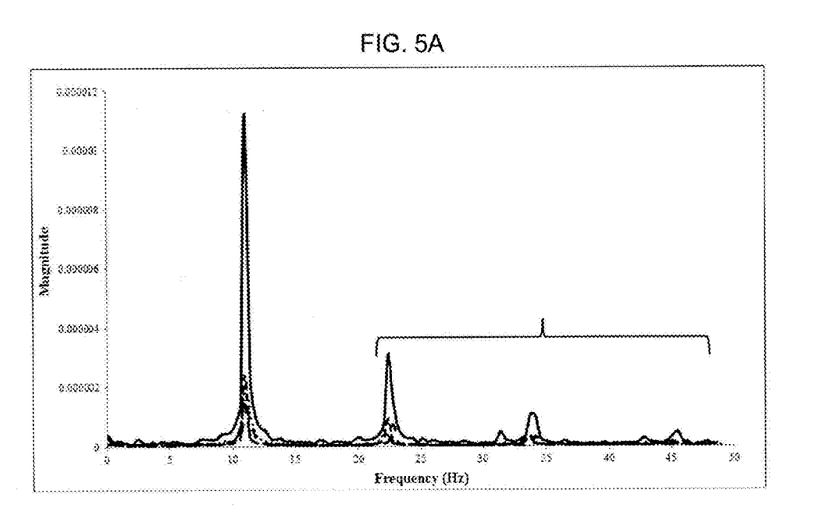
FIG. 5A shows a Fast Fourier Transform of all five Applicants' accelerometer electrodes boards a 11.00 Hz.
Figure 5B:
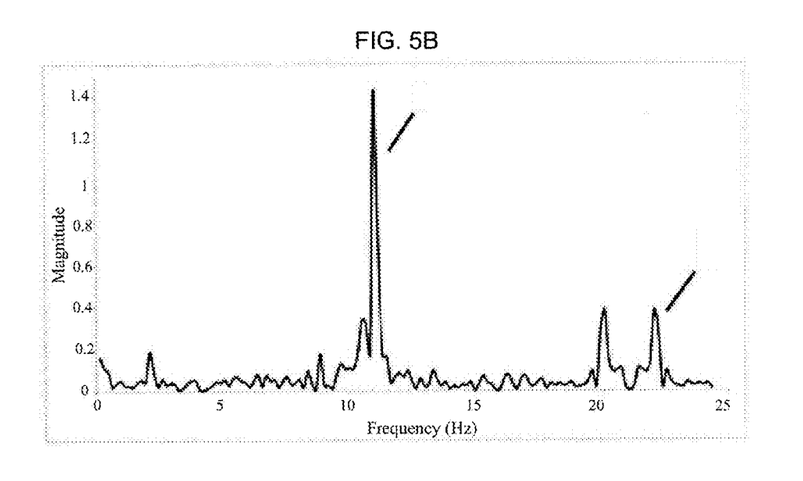
FIG. 5B shows a Fast Fourier Transform of data generated by the MMA7361 accelerometer at 11.00 Hz.

FIG. 5A recites data for the 11.00 Hz tests. FIG. 5A recites data for each of the five (5) different PCB tracings. The number of frequency harmonics detected clearly differs for the five different sensors designs 210, 220, 230, 240, and 250.

FIG. 5A shows the existence of harmonics which are a result of the rotational nature of the reciprocating saw testing apparatus. These harmonics could potentially be an important measurement for some applications. Applicants' accelerometer differs from the commercial MMA7361 accelerometer in that it has much higher peaks for the detected harmonics. This increased sensitivity of the Applicants' accelerometer is due to the high sensitivity of the conductive foam creating very small and detectable changes within the system, a feature which could be desirable for many applications, especially within the medical applications field.

In the frequency domain graphs FIGS. 3A, 4A, and 5A of the Applicants' accelerometer there are several additional peaks which are not visible in that of the Freescale accelerometers graph. These harmonics, caused as a result of the natural imbalance of the testing mechanism, are showing up on the graph of the Applicants' accelerometer for several reasons.

The Applicants' accelerometer, unlike the MMA7361 accelerometer, has no filtering or processing being done to it to eliminate these harmonics. The design differences, macro versus micro, between the foam and MMA7361 accelerometer respectively are also causes for these harmonics. It is also possible that there may be harmonic distortion due to the method of detection or design of the electrode which is causing false harmonics to appear. In actuality, it is likely a combination of one or more of these reasons.

Figure 6:
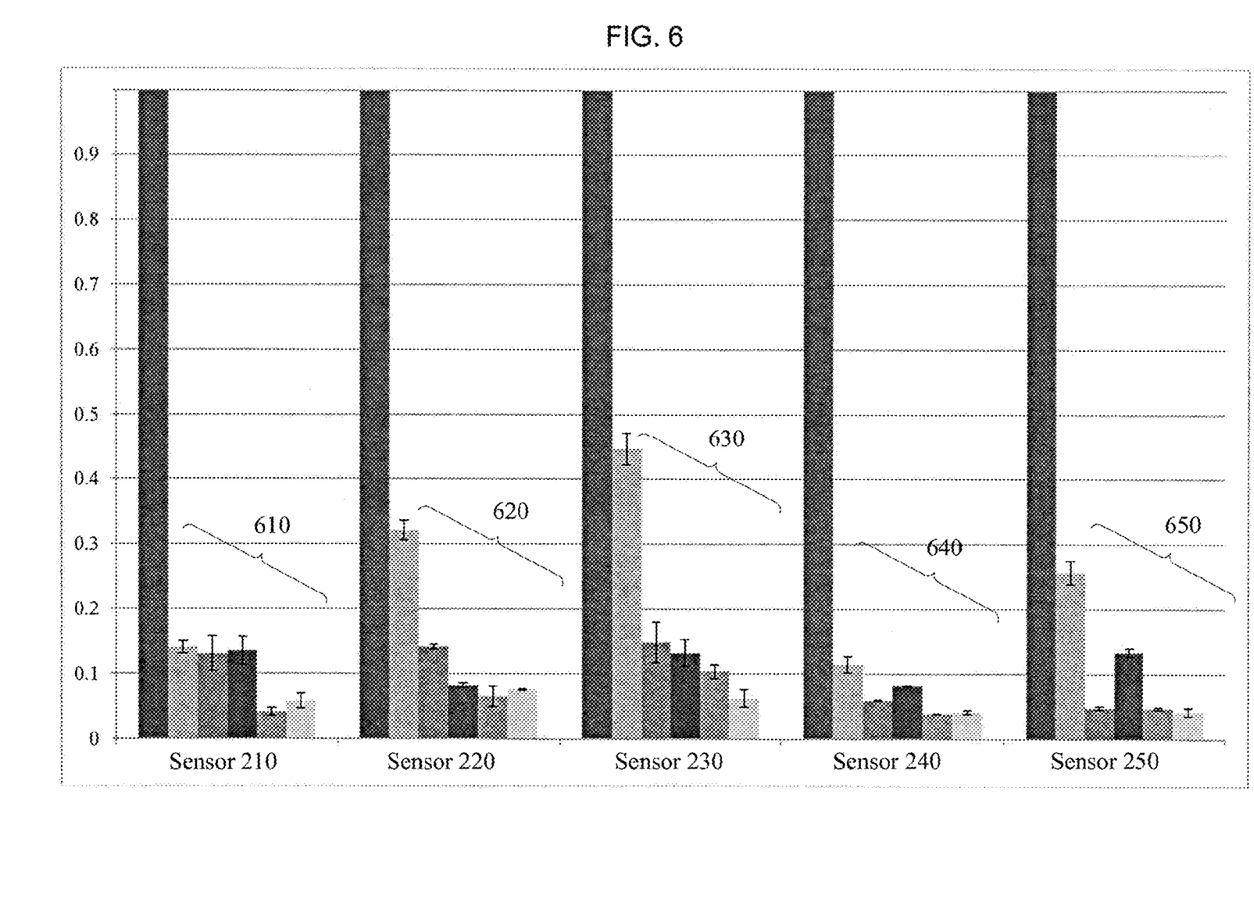
FIGS. 6, 7, and 8 graphically recite normalized values for the desired frequency peaks, 6.28 Hz, 8.35 Hz, and 11.00 Hz, respectively, followed by the peaks of the harmonics for each sensor.

Referring now to FIG. 6, harmonic data from the frequency domain of the Applicants' accelerometer tested at 6.28 Hz compares the amplitudes of the harmonics on a 0 to 1 scale. Here the first bar of each sensor represents the measured frequency of: 6.28 Hz, Subsequent bars represent measurable harmonics of the frequency domain. Each of the sensors in the graph corresponds to a different electrode design as seen in FIG. 2.

Figure 7:
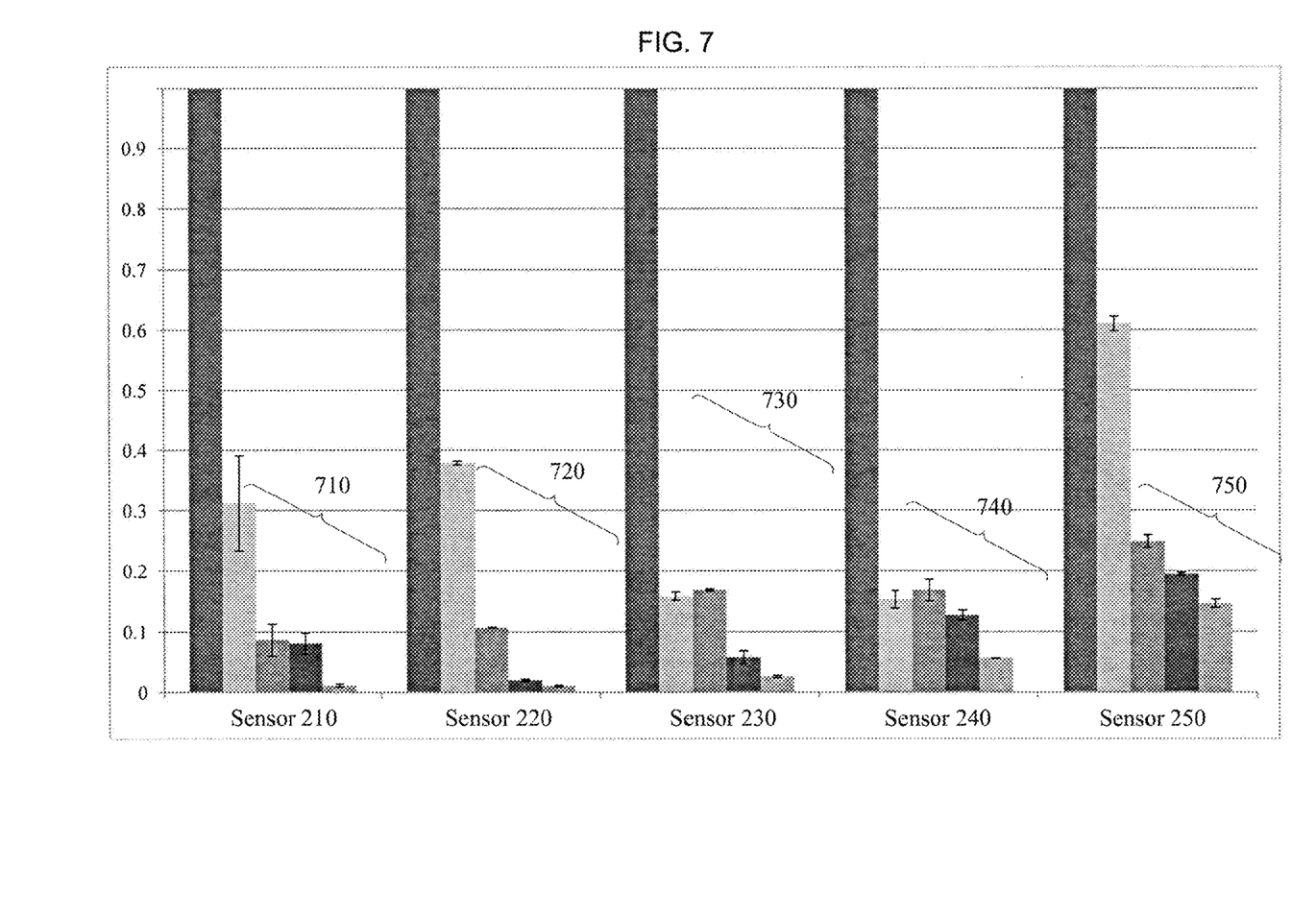

Referring now to FIG. 7, harmonic data from the frequency domain of the Applicants' accelerometer tested at 8.35 Hz compares the amplitudes of the harmonics on a 0 to 1 scale. Here the first bar of each sensor represents the measured frequency of: 8.35 Hz, Subsequent bars represent measurable harmonics of the frequency domain. Each of the sensors in the graph corresponds to a different electrode design as seen in FIG. 2.

Figure 8:
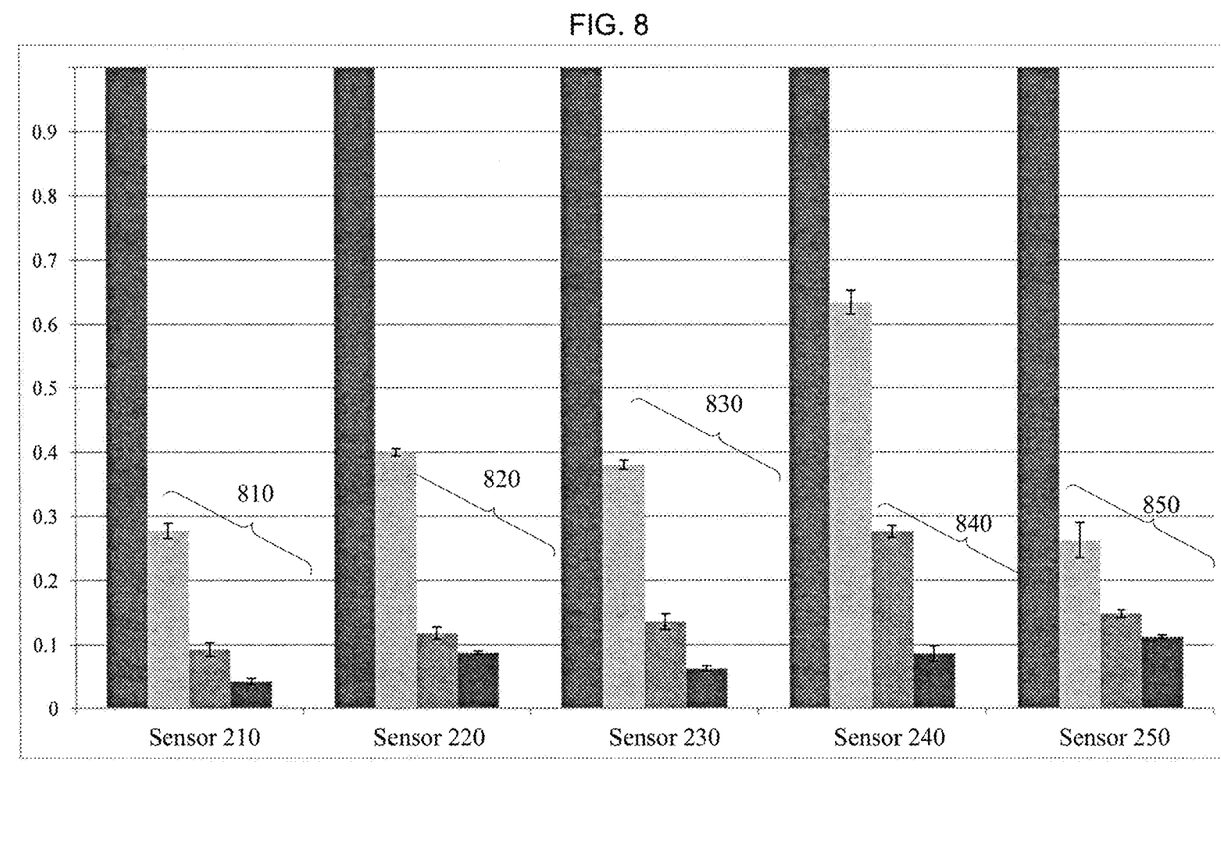

Referring now to FIG. 8, harmonic data from the frequency domain of the Applicants' accelerometer tested at 11.00 Hz compares the amplitudes of the harmonics on a 0 to 1 scale. Here the first bar of each sensor represents the measured frequency of: 11.00 Hz, Subsequent bars represent measurable harmonics of the frequency domain. Each of the sensors in the graph corresponds to a different electrode design as seen in FIG. 2.

As shown in FIGS. 6, 7, and 8, no single electrode design minimizes or maximizes all of the harmonics. If an application is undergoing a specific frequency, it may be desirable to use one electrode design over another for the purpose of either minimizing or amplifying the harmonics. In FIG. 6, sensor 240 has the overall lowest amplitude, but the largest amplitudes in FIG. 8, making it a better choice for lower frequencies and minimal harmonic amplitudes. Similarly, sensor 230 minimizes harmonics in the 8.35 Hz range, but has increased sensitivity to harmonics in both the 6.28 and 11 Hz range.

Figure 9:
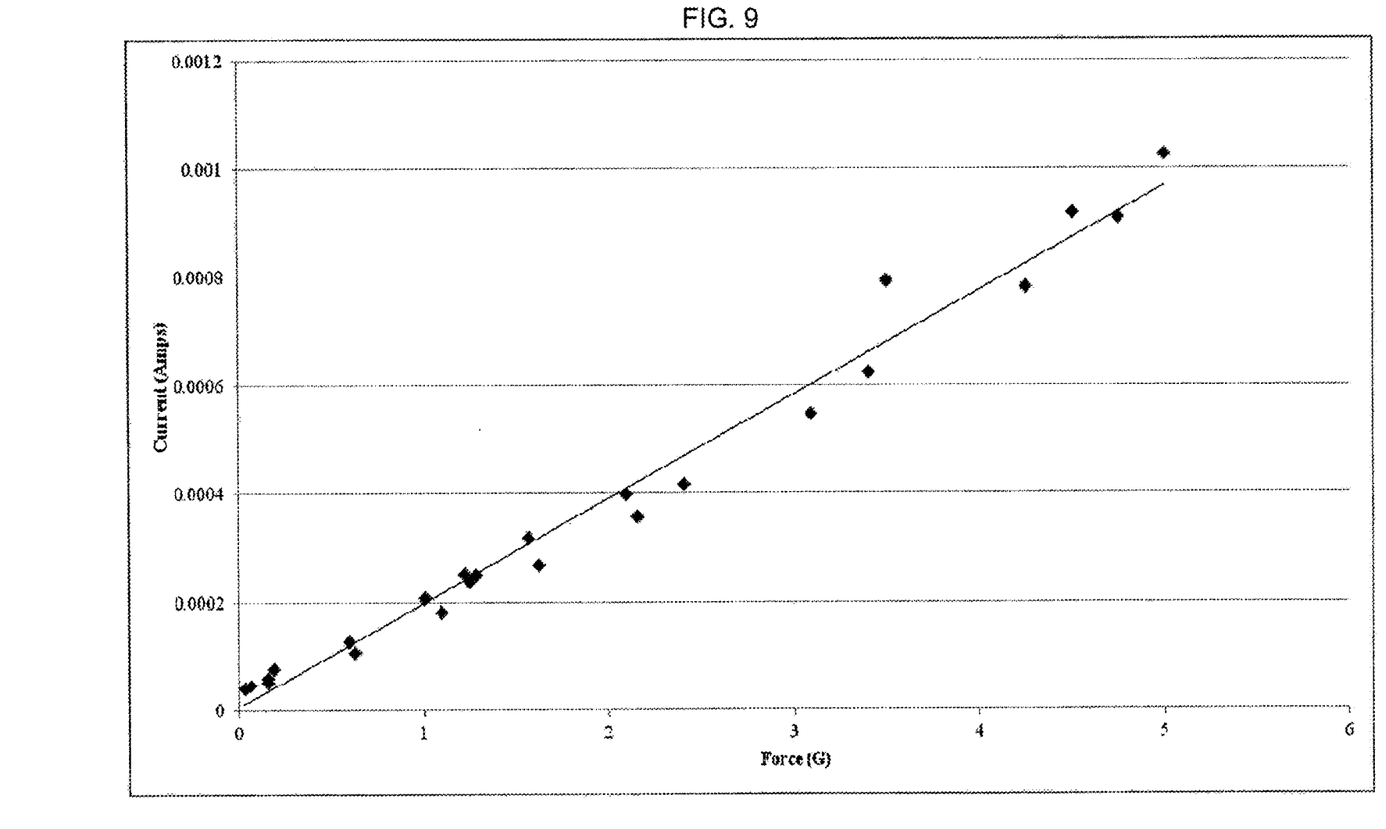
FIG. 9 is a calibration curve of the Applicants' accelerometer relating force to current.

Referring now to FIG. 9, the amount of current was compared to the measured g-forces to determine a relation, if any. It was found that there is an increasing linear relation, as seen in FIG. 9, where the R2 value is equal to 0.9669. The more tightly spaced points on the graph indicate there is a stronger correlation between force and current at lower g-forces.

CONCLUSION

Accelerometers will continue to play an important role in the medical field, both for wearable and implantable devices. The detection of traumatic brain injuries in athletes, soldiers, and even elderly patients is a growing concern without a viable solution. Applicants' accelerometer has the potential to address this problem with its ability to accurately detect impact and acceleration forces in a variety of shapes and sizes.

As previously discussed, the flexible foam nature of the sensor would allow for the accelerometer to be fitted inside of existing helmets, around a wrist on a wearable sensor, or even miniaturized and fitted inside an implantable device. The use of a potentiostat as a detection method ensures a high sensitivity level, and combined with a specific electrode design each accelerometer can be tailored to a specific application.

While the preferred embodiments of the present invention have been illustrated in detail, it should be apparent that modifications and adaptations to those embodiments may occur to one skilled in the art without departing from the scope of the present invention as set forth herein.

We claim:
1. An accelerometer, comprising
   a pair of electrodes configured as a printed circuit board electrode pair;
   a first electrically conductive foam; and
   a second electrically conductive foam;
   wherein said first electrically conductive foam and said second electrically conductive foam encompass the printed circuit board electrode pair, wherein a weighted mass disposed between said first electrically conductive foam and said second electrically conductive foam.
2. The accelerometer of claim 1, wherein said printed circuit board electrode pair are interleaved.
3. A helmet having an accelerometer fitted inside thereof, said accelerometer comprising:
   a pair of electrodes configured as a printed circuit board electrode pair;
   a first electrically conductive foam; and
   a second electrically conductive foam;
   wherein said first electrically conductive foam and said second electrically conductive foam encompass the printed circuit board electrode pair, wherein a weighted mass disposed between said first electrically conductive foam and said second electrically conductive foam.
4. The helmet of claim 3, wherein said printed circuit board electrode pair are interleaved.
5. A wrist band comprising an accelerometer, said accelerometer comprising:
   a pair of electrodes configured as a printed circuit board electrode pair;
   a first electrically conductive foam; and
   a second electrically conductive foam;
   wherein said first electrically conductive foam and said second electrically conductive foam encompass the printed circuit board electrode pair, wherein a weighted mass disposed between said first electrically conductive foam and said second electrically conductive foam.
6. The wrist band of claim 5, wherein said printed circuit board electrode pair are interleaved.
7. A method to measure impact forces, comprising:
   providing an accelerometer comprising a pair of electrodes configured as a printed circuit board electrode pair, a first electrically conductive foam, and a second electrically conductive foam, wherein said first electrically conductive foam and said second electrically conductive foam encompass the printed circuit board electrode pair;
   attaching said accelerometer to an object;
   impacting said object/accelerometer assembly with a force;
   measuring an electrical current generated during said impact; and
   determining a G force impact based upon said measured electrical current, wherein a weighted mass disposed between said first electrically conductive foam and said second electrically conductive foam.
8. The method of claim 7, wherein said printed circuit board electrode pair are interleaved.

* * * * *